United States Patent
Piché et al.

(10) Patent No.: US 7,245,662 B2
(45) Date of Patent: Jul. 17, 2007

(54) DCT-BASED SCALABLE VIDEO COMPRESSION

(76) Inventors: Christopher Piché, #500 - 100 Park Royal South, West Vancouver, British Columbia (CA) V7T 1A2; Shahadatullah Khan, 1102 - 145 Georges Avenue, North Vancouver, British Columbia (CA) V7L 3G8; Jozsef Vass, 520 West 20th Street, North Vancouver (CA) V7M 1Y7

( * ) Notice: Subject to any disclaimer, the term of this patent is extended or adjusted under 35 U.S.C. 154(b) by 715 days.

(21) Appl. No.: 10/415,008

(22) PCT Filed: Oct. 24, 2001

(86) PCT No.: PCT/CA01/01517

§ 371 (c)(1),
(2), (4) Date: Apr. 23, 2003

(87) PCT Pub. No.: WO02/35854

PCT Pub. Date: May 2, 2002

(65) Prior Publication Data

US 2004/0013194 A1    Jan. 22, 2004

(51) Int. Cl.
*H04N 7/12* (2006.01)
*G06K 9/36* (2006.01)

(52) U.S. Cl. .................. 375/240.2; 382/250
(58) Field of Classification Search ......... 375/240.16, 375/240.11, 240.03, 240.2; 382/236, 250, 382/247, 232, 240
See application file for complete search history.

(56) References Cited

U.S. PATENT DOCUMENTS

| 5,602,589 | A | * | 2/1997 | Vishwanath et al. ... 375/240.11 |
| 5,946,043 | A | | 8/1999 | Chen et al. |
| 5,973,738 | A | | 10/1999 | Srivastava |
| 6,130,912 | A | * | 10/2000 | Chang et al. .......... 375/240.16 |
| 6,850,649 | B1 | * | 2/2005 | Malvar .................. 382/240 |
| 6,917,711 | B1 | * | 7/2005 | Wang et al. ............ 382/232 |

FOREIGN PATENT DOCUMENTS

DE    197 34 542    2/1999

OTHER PUBLICATIONS

D. Kalles and A.N. Skodras, Motion Estimation and DCT Pruning: A Combined Approach to Video Coding, Electronics Laboratory, University of Patras, GR-26110 Patras, Greece.

* cited by examiner

*Primary Examiner*—Gims Philippe

(57) ABSTRACT

A method of encoding an input video signal for communication over a computer network, the method comprising the steps of: i) dividing each frame into a two-dimensional array of macroblocks; ii) detecting motion between each macroblock of a current frame and the corresponding macroblock of a previous frame, and coding only those macroblocks where motion is detected; iii) replacing all coefficients of non-coded macroblocks with zero coefficients; iv) applying discrete cosine transformation to coded macroblocks; v) reorganizing coefficients into a multi-resolution representation; vi) quantizing the coefficients with a uniform scalar quantizer to produce a significance map; and vii) adaptive arithmetic coding of said signal by encoding the motion information, encoding the significance map, encoding the signs of all significant coefficients, and encoding the magnitudes of significant coefficients, in bit-plane order starting with the most significant bit.

12 Claims, 5 Drawing Sheets

DCT-BASED SCALABLE VIDEO COMPRESSION

CROSS-REFERENCE TO RELATED APPLICATION

This application is a National Stage Application of International Application No. PCT/CA01/015 17, filed Oct. 24, 2001, which claims the benefit under 35 USC 119(e) of the U.S. Provisional Patent Application No. 60/242,938, filed Oct. 24, 2000, where this provisional application is incorporated by reference in its entirety.

TECHNICAL FIELD

This invention relates generally to multimedia communications and more particular to methods and systems for the compression/decompression and encoding/decoding of video information transmitted over the Internet.

BACKGROUND

With the availability of high-performance personal computers and popularity of broadband Internet connections, the demand for Internet-based video applications such as video conferencing, video messaging, video-on-demand, etc. is rapidly increasing. To reduce transmission and storage costs, improved bit-rate compression/decompression ("codec") systems are needed. Image, video, and audio signals are amenable to compression due to considerable statistical redundancy in the signals. Within a single image or a single video frame, there exists significant correlation among neighboring samples, giving rise to what is generally termed "spatial correlation". Also, in moving images, such as full motion video, there is significant correlation among samples in different segments of time such as successive frames. This correlation is generally referred to as "temporal correlation". There is a need for an improved, cost-effective system and method that uses both spatial and temporal correlation to remove the redundancy in the video to achieve high compression in transmission and to maintain good to excellent image quality, while adapting to change in the available bandwidth of the transmission channel and to the limitations of the receiving resources of the clients.

A known technique for taking advantage of the limited variation between frames of a motion video is known as motion-compensated image coding. In such coding, the current frame is predicted from the previously encoded frame using motion estimation and compensation, and only the difference between the actual current frame and the predicted current frame is coded. By coding only the difference, or residual, rather than the image frame itself, it is possible to improve image quality, for the residual tends to have lower amplitude than the image, and can thus be coded with greater accuracy. Motion estimation and compensation are discussed in Lim, J. S. *Two-Dimensional Signal and Image Processing*, Prentice Hall, pp. 497-507 (1990). However, motion estimation and compensation techniques have high computational cost, prohibiting software-only applications for most personal computers.

Further difficulties arise in the provision of a codec for an Internet streamer in that the bandwidth of the transmission channel is subject to change during transmission, and clients with varying receiver resources may join or leave the network as well during transmission. Internet streaming applications require video encoding technologies with features such as low delay, low complexity, scalable representation, and error resilience for effective video communications. The current standards and the state-of-the-art video coding technologies are proving to be insufficient to provide these features. Some of the developed standards (MPEG-1, MPEG-2) target non-interactive streaming applications. Although H.323 Recommendation targets interactive audio-visual conferencing over unreliable packet networks (such as the Internet), the applied H.26x video codecs do not support all the features demanded by Internet-based applications. Although new standards such as H.263+ and MPEG-4 started to address some of these issues (scalability, error resilience, etc.), the current state of these standards is far from being complete in order to support a wide range of video applications effectively.

Due to very heterogeneous networking and computing infrastructure, highly scalable video coding algorithms are required. A video codec should provide reasonable quality to low-performance personal computers connected via a dial-up modem or a wireless connection, and high quality to high-performance computers connected using T1. Thus the compression algorithm is expected to scale well in terms of both computational cost and bandwidth requirement.

Real Time Protocol (RTP) is most commonly used to carry time-sensitive multimedia traffic over the Internet. Since RTP is built on the unreliable user datagram protocol (UDP), the coding algorithm must be able to effectively handle packet losses. Furthermore, due to low-delay requirements of the interactive applications and multicast transmission requirements, the popular retransmission method widely deployed over the Internet cannot be used. Thus the video codec should provide high degree of resilience against network and transmission errors in order to minimize impact on visual quality.

Computational complexity of the encoding and decoding process must be low in order to provide reasonable frame rate and quality on low-performance computers (PDAs, hand-held computers, etc.) and high frame-rate and quality on average personal computers. As mentioned, the popularly applied motion estimation and motion compensation techniques have high computational cost prohibiting software-only applications for most personal computers.

SUMMARY OF INVENTION

This invention provides a new method of video encoding by performing reorganization, significance mapping, and bitstream layering of coefficients derived from discrete transform operations on original frames in which motion has been detected. Moving areas of a frame are updated using intracoding or differential coding based upon the difference between a current portion of a frame and the same portion from a previous frame. The previous frame can be either the previous original frame or a previous reconstructed frame. In order to increase error resilience, part of the frame can be periodically updated (intracoded) in a distributed manner, regardless of whether or not motion is detected. Discrete cosine transform (DCT) is carried out in sub-portions of each of the coded frame portions. The resulting coefficients are reorganized into a three-level multiple-resolution representation. The coefficients are then quantized into significant (one) and insignificant (zero) values, which determine a significance map. The map is rearranged by order of significance into bitstream layers that are encoded using adaptive arithmetic coding. The coding scheme provides scalability, high coding performance, and error resilience while incurring low coding delays and computational complexity.

BRIEF DESCRIPTION OF DRAWINGS

In Figures which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

Figure 1:
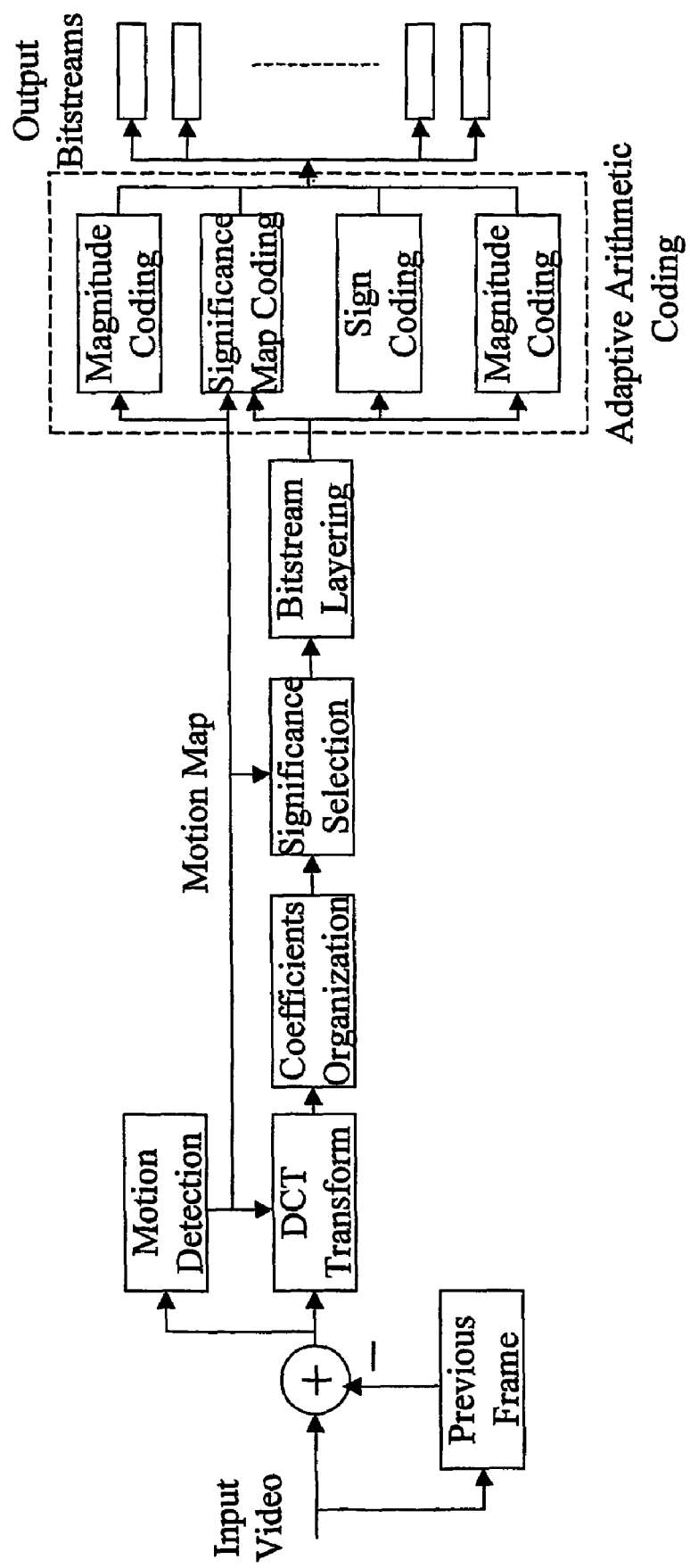
FIG. 1 is a functional block diagram of the encoder of a codec operated in accordance with an embodiment of the invention.
Figure 2:
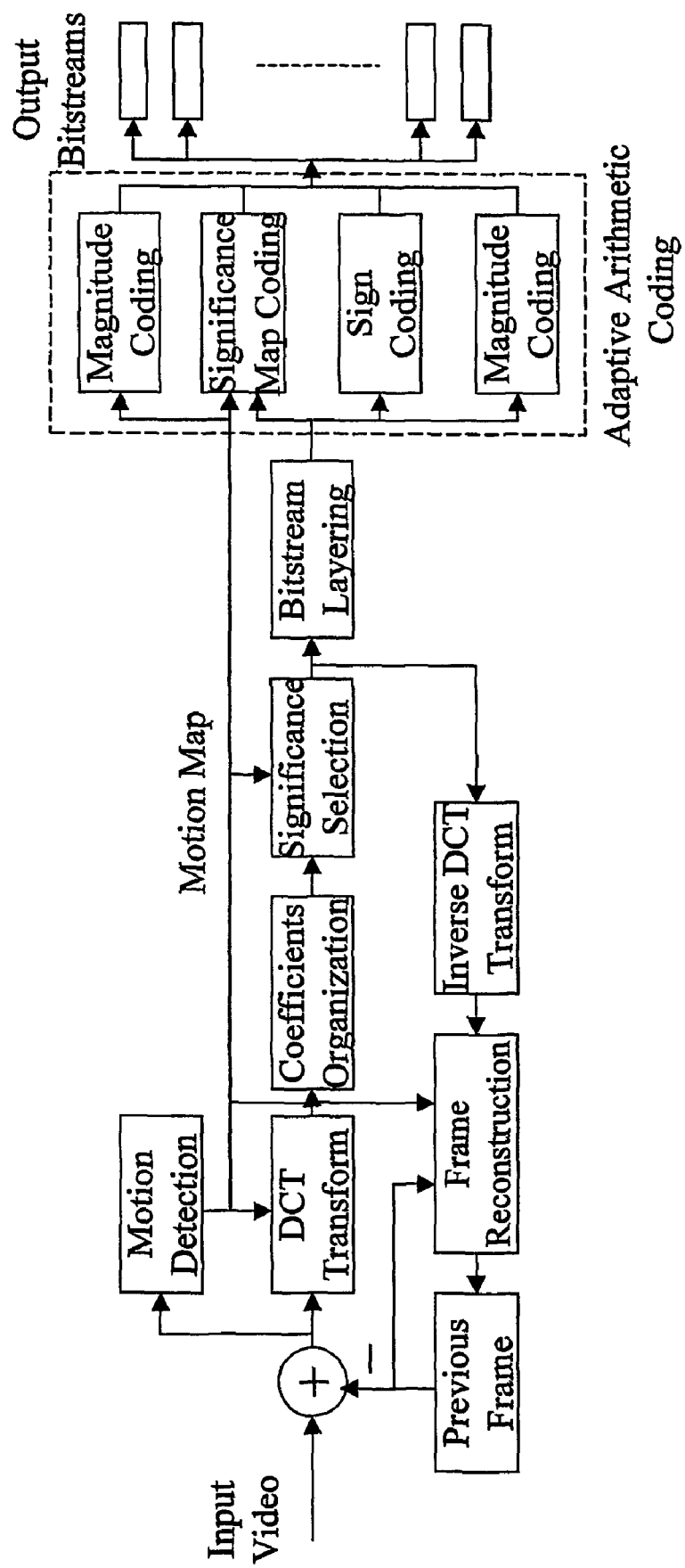
FIG. 2 is a functional block diagram of the encoder of a codec operated in accordance with an alternative embodiment of the invention, involving frame reconstruction at the encoder.

Each of FIG. 1 and FIG. 2 depict a functional block diagram of the encoder of a codec according to embodiments of the invention. In each case, the encoding process consists of the following steps:

Motion detection;
Coefficients reorganization;
Coefficients partitioning;
Bitstream layering; and
Application of adaptive arithmetic coding.

Each of these steps will be explained in detail below. This process can be implemented using software alone, if desired.

FIG. 1 represents a simple encoding architecture according to the invention. It uses the previous original frame as the reference. The encoder does not maintain the state of the decoder, which means that error may accumulate between the original and reconstructed frames. Although error accumulation lowers the signal-to-noise ratio of the frames, a measure traditionally used for comparing objective performance, research has determined that the impact on visual quality is minimal. The codec architecture illustrated in FIG. 1 provides high error resilience and low computational complexity.

FIG. 2 represents a more sophisticated encoding architecture according to the invention, including a step of frame reconstruction at the encoder itself. In FIG. 2, the previously reconstructed frame is used as the reference for motion detection. Thus the encoder maintains the state of the decoder and the error accumulation (as in the previous structure) is avoided resulting in higher objective performance (higher signal-to-noise ratio). However, this comes at the cost of higher computational complexity of the encoder and higher error sensitivity of the bitstream.

Motion Detection

Motion detection is not to be confused with the computationally complex "motion estimation and compensation" technique described above. Motion detection does not involve predicting/estimating the current frame based on a previous frame and encoding only the difference between the prediction/estimation and the actual frame. Rather, motion detection according to the present invention simply detects actual differences between the current frame and a previous frame, offering high error resilience and low computational complexity.

Motion detection is based on conditional replenishment—that is, only moving areas of the frame are updated using intracoding (encoding process which does not use data from the reference frame) and/or differential coding (encoding process where only the difference with the corresponding reference frame data is encoded). In one embodiment of the invention, each frame is divided into a two-dimensional array of macroblocks (MBs) each of size 16 pixels by 16 pixels, and this procedure is carried out for each MB separately. As illustrated in FIG. 1 and FIG. 2, motion detection may use either the previous original frame or the previous reconstructed frame as the reference.

When the previous original frame is used as reference, as in the embodiment illustrated in FIG. 1, each MB may have two states. If the difference between current MB and previous original MB is larger than a single given threshold, then the MB is coded, preferably by intracoding. Otherwise, the MB is not coded at all and the decoder replaces the pixels within the MB from the previous frame.

When the previous reconstructed frame is used as reference, as in the embodiment illustrated in FIG. 2, each MB may have three states. Two thresholds $T_1$ and $T_2$ ($T_1 < T_2$) are defined. If the difference between the current MB and previous reconstructed MB is smaller than $T_1$, then the MB is not coded. If the difference is larger than $T_1$ but smaller then $T_2$, then preferably the difference between the current MB and previously reconstructed MB is coded (that is, by differential coding). Finally, if the difference is larger than $T_2$, then the MB is coded, preferably by intracoding.

Figure 3:
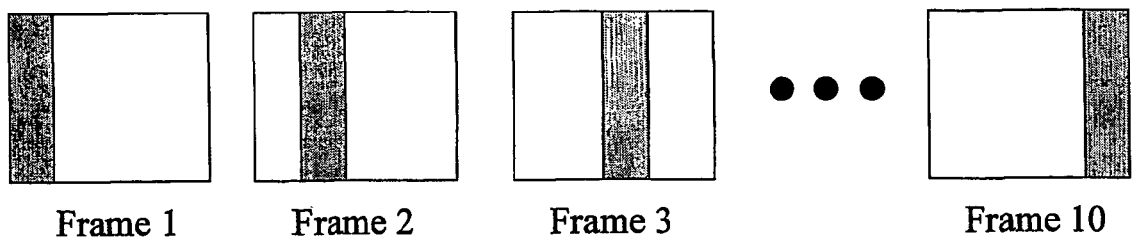
FIG. 3 is a pictorial representation illustrating how portions of a frame are periodically updated (intracoded) in a distributed manner, in accordance with an embodiment of the invention.

In order to increase error resilience, part of the frame may be periodically updated (intracoded) in a distributed manner, as illustrated in FIG. 3. Based on extensive experiments over the Internet, 10% of the frame is preferably intracoded regardless of motion—that is, the entire frame is fully intracoded in ten frames. This forced intraupdate results in significant performance gain in lossy networks such as the Internet compared to the traditional I-frame refresh applied in standard video codecs such as H.263 and MPEG-2.

DCT Coefficients Reorganization

Figure 4:
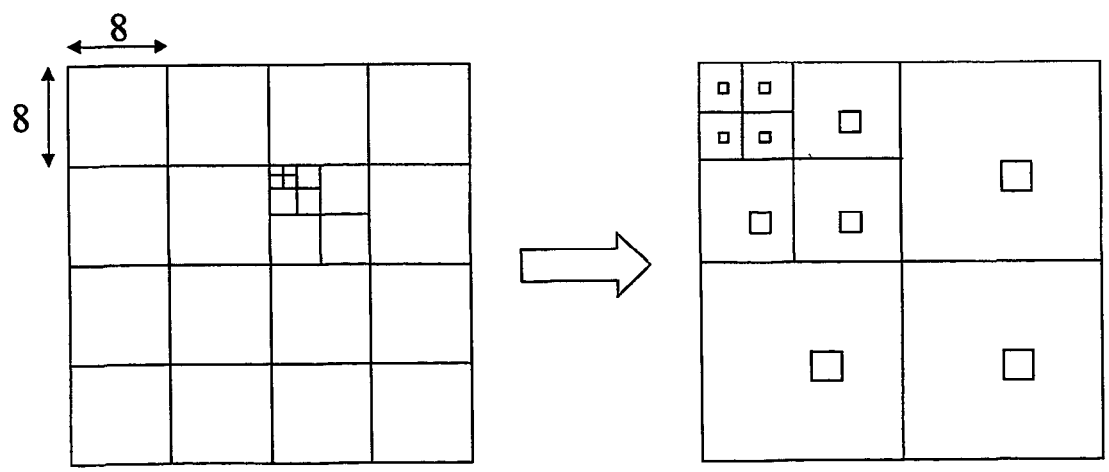
FIG. 4 is a pictorial representation illustrating the reorganization of DCT coefficients into a multi-resolution structure.

After motion detection, each MB is preferably further partitioned into four nonoverlapping blocks each of size 8 pixels by 8 pixels. If the MB is not coded, then all the coefficients are replaced with zero coefficients. Otherwise, discrete cosine transform (DCT) is carried out on each of the blocks. After DCT, coefficients are reorganized into a three-level multi-resolution representation such as that shown in FIG. 4. Coefficients reorganization provides two advantages:

It increases error resilience significantly. The effects of packet losses will be uniformly distributed over the entire image instead of being concentrated into specific image regions, providing less disturbing visual artifacts.

Figure 5:
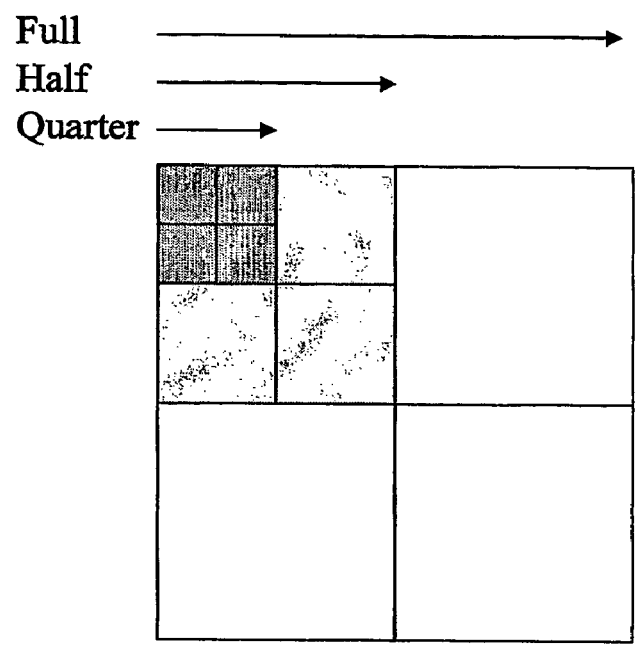
FIG. 5 is a pictorial representation illustrating the spatial scalability provided by a codec according to the invention.

Spatial scalability can be efficiently supported, as shown in FIG. 5.

DCT Coefficients Partitioning

After DCT transformation and data reorganization, coefficients are quantized with a uniform scalar quantizer. DCT coefficients that are quantized to nonzero are termed significant coefficients. DCT coefficients that are quantized to zero are insignificant coefficients. Thus the quantization procedure determines a map of significant coefficients which can be described as a significance map. The significance map is a binary image of size equal to that of the original image. Binary "0" means that the DCT coefficient at the corresponding location is insignificant, and binary "1" means that the DCT coefficient at the corresponding location is significant.

Bitstream Layering

Figure 6:
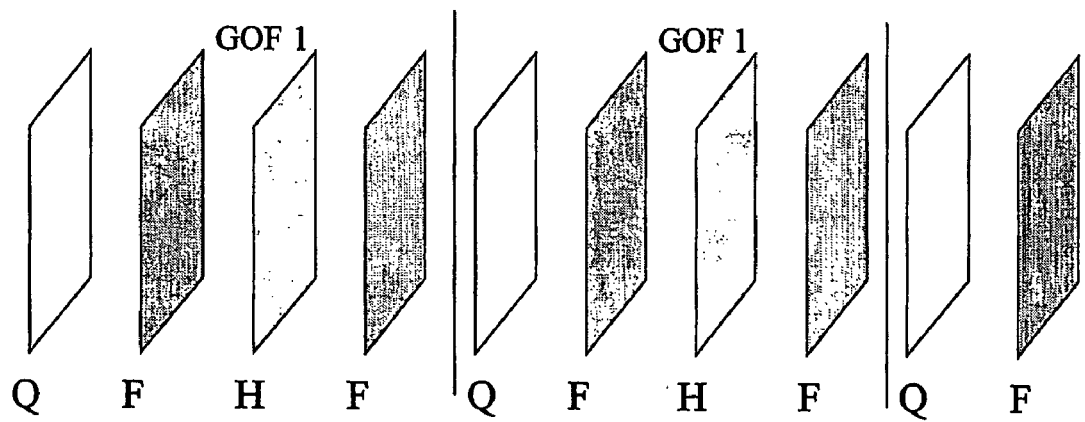
FIG. 6 is a pictorial representation illustrating the temporal scalability provided by a codec according to the invention.

One of the key advantages of a codec according to this invention is its scalability in multiple dimensions. It provides three levels of temporal scalability and three levels of spatial scalability. FIG. 6 illustrates three levels of temporal scalability. In FIG. 6, "Q" means quarter resolution, "H" means "half resolution", "F" means "full resolution", and "GOF" means "group of frames".

Take, for example, a video sequence encoded at 30 frames/second. The receiver is able to decode the video at 30 frames/second, 15 frames/second, or 7.5 frames/second. A codec according to the present invention also supports three levels of spatial scalability, as shown in FIG. 5. This means that if the original video is encoded at 352×288 pixel resolution, then it can be decoded at full spatial resolution (352×288 pixels), half spatial resolution (176×144 pixels), or quarter spatial resolution (88×72 pixels) as well.

In addition to temporal and spatial scalability, SNR scalability is also supported by transmitting significant coefficients in bit-plane order starting from the most significant bit.

Adaptive Arithmetic Coding

Adaptive arithmetic coding is a four-stage procedure. First, the motion information is encoded. Second, the significance map is encoded. Third, the signs of all significant coefficients need are encoded. Finally, magnitudes of significant coefficients are encoded.

The motion information is encoded by using adaptive arithmetic coding. If the previous original frame is used as the reference, only two symbols are needed ("not coded" and "intracoded"). If the previous reconstructed frame is used as reference, then three symbols are usually needed ("not coded", "differentially coded", and "intracoded").

Figure 7:
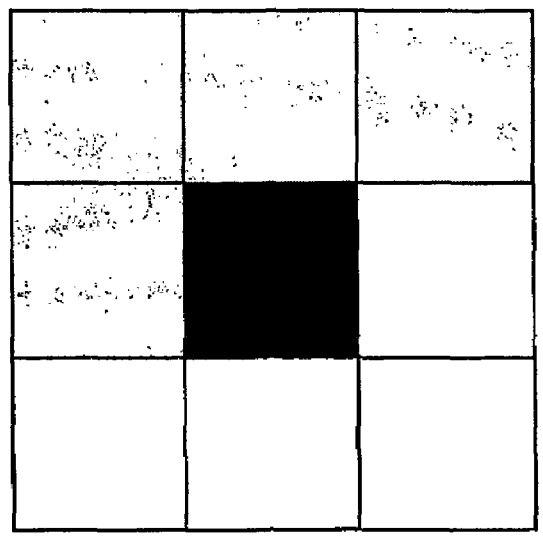
FIG. 7 is a pictorial representation illustrating a probability model for coding/transmitting significance information.

The significance information of the DCT coefficients of the coded MBs needs to be encoded. The frame is scanned in "subband" order from coarse to fine resolution. Within each subband, the coefficients are scanned from top to bottom, left to right. It is observed that a large percentage (about 80%) of the DCT coefficients is insignificant. Binary adaptive arithmetic coding is used to encode the significance information of DCT coefficients. SIG and INSIG symbols denote significant and insignificant coefficients, respectively. During adaptive arithmetic coding, each pixel may be coded assuming a different probability model (each a "context"). In one embodiment, the context of each pixel is based on the significance status of its four neighboring pixels in its causal neighborhood as shown in FIG. 7. In FIG. 7, the causal neighborhood of a pixel is the set of four pixels (3 pixels in the previous row and one pixel in the previous column) which are already encoded or decoded. Since the encoder and decoder shall use the same probability model during the coding process, the probability model of the current pixels can be based only on the knowledge of the already transmitted pixels. In this embodiment of the invention, a total of five probability models are used (0 significant, 1 significant, . . . , 4 significant).

Figure 8:
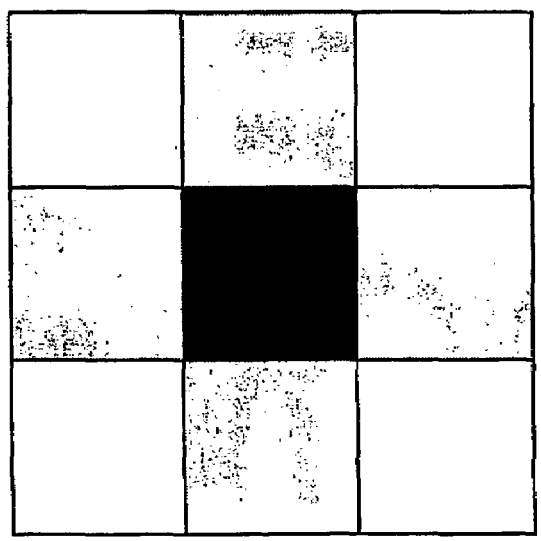
FIG. 8 is a pictorial representation illustrating a probability model for coding/transmitting the sign and magnitude of significant DCT coefficients.

The sign of significant DCT coefficients is also encoded using binary adaptive arithmetic coding. POS and NEG symbols denote positive and negative significant DCT coefficients, respectively. In this case, the context is determined by the number of significant coefficients in a small spatial neighborhood shown in FIG. 8. This context is calculated from the already transmitted significance map. In this embodiment of the invention, a total of five models are used (0 significant, 1 significant, . . . , 4 significant).

Magnitudes of significant DCT coefficients are encoded in bit-plane order. Again, a binary adaptive arithmetic codec with two symbols is used to encode each bit-plane. As with the sign of significant coefficients, the context is determined by the number of significant DCT coefficients in a small neighborhood such as that shown in FIG. 8. The transmission order proceeds from the most significant bit-plane to the least significant bit-plane providing SNR scalability.

In respect of the embodiment of the invention illustrated in FIG. 2, involving frame reconstruction, an inverse discrete cosine transform is carried out on the significance maps for the purpose of reconstructing each frame at the encoder.

A video codec according to the present invention provides the following highly desirable features:

Low coding delay: Since no frame buffering is needed, the codec provides the lowest possible coding delay. As soon as a frame arrives from the capture device, it is coded immediately.

Low computational complexity: The encoder and decoder of the codec have low and approximately symmetric computational complexity. This is because the method of the invention uses a simpler process of motion detection than the traditional process of motion estimation and compensation. The encoder has lower complexity than block-based motion estimation/compensation schemes by an order of magnitude. One implementation of the codec provides about 40 frames/second with a frame size of 176×144 pixels and with both the encoder and decoder executing on a 667 MHz Pentium III computer with a Windows 2000 operating system.

Scalable coding: The codec provides temporal, resolution, and SNR scalability. This enables a distributed video application such as video conferencing to dynamically adjust video resolution, frame rate, and picture quality of the received video depending on the available network bandwidth and hardware capabilities of the receiver. Receivers with high bandwidth network connections and high-performance computers may receive high quality color video at high frame rate while receivers with low bandwidth connections and low-performance computers may receive lower quality video at a lower frame rate.

Error resilience: The bitstream of the codec provides a high degree of error resilience for networks with packet loss such as the Internet. The encoding technique limits the effect of channel errors in the smallest possible temporal and spatial neighborhood. Undesirable temporal and spatial error propagation is prevented by using intraupdate and/or differential update instead of motion estimation/compensation. Furthermore, the applied coefficients reorganization and distributed forced intraupdate significantly increases the error resilience of the codec.

High coding performance: High coding performance is needed in order to provide users with high video quality over low bandwidth network connections. A more efficient compression algorithm means that users receive higher picture quality for a given bit rate. The codec provides similar visual quality when compared with H.263 for low motion scenes, and a little compromise in visual quality for high motion scenes (due to lack of motion estimation and compensation). However, the performance compromise for high motion scenes is more than justified by the low coding delay, low computational complexity, scalable bitstream, and high error resilience.

As will be apparent to those skilled in the art in the light of the foregoing disclosure, many alterations and modifications are possible in the practice of this invention without departing from the scope thereof. Accordingly, the scope of the invention is to be construed in accordance with the substance defined by the following claims.

What is claimed is:

1. A method of encoding an input video signal comprising a group of video frames for communication over a computer network, the method comprising the steps of: i) dividing each frame into a two-dimensional array of macroblocks; ii) detecting motion between each macroblock of a current frame and the corresponding macroblock of a previous frame, and coding only those macroblocks where motion is detected; iii) replacing all coefficients of non-coded macroblocks with zero coefficients; iv) applying discrete cosine transformation (DCT) to coded macroblocks to produce DCT coefficients; v) reorganizing coefficients into a multi-resolution representation; vi) quantizing the coefficients with a uniform scalar quantizer to produce a significance map; and vii) adaptive arithmetic coding of said signal by a) encoding the motion information; b) encoding the significance map; c) encoding the signs of all significant coefficients; and d) encoding the magnitudes of significant coefficients, in bit-plane order starting with the most significant bit.

2. The method of claim 1 wherein said previous frame is the previous original frame.

3. The method of claim 2 wherein the motion detection and coding step is such that: i) if the motion detected does not exceed a threshold, then said macroblock is not coded; and iii) if the motion detected exceeds said threshold, then said macroblock is intracoded.

4. The method of claim 1 further comprising the step of reconstructing each frame from the motion information and significance map, and wherein said previous frame is the previous reconstructed frame.

5. The method of claim 4 wherein the motion detection and coding step is such that: i) if the motion detected does not exceed a first threshold, then said macroblock is not coded; ii) if the motion detected exceeds said first threshold but does not exceed a second threshold, then the difference between said current frame and said previous frame is coded; and iii) if the motion detected exceeds both first and second thresholds, then said macroblock is intracoded.

6. The method of claim 1 further comprising the step, regardless of whether or not motion is detected, of periodically intracoding portions of each frame in a distributed manner.

7. A computer program product for encoding an input video signal comprising a group of video frames for communication over a computer network, said computer program product comprising: (A) a computer usable medium having computer readable program code means embodied in said medium for: i) dividing each frame into a two-dimensional array of macroblocks; ii) detecting motion between each macroblock of a current frame and the corresponding macroblock of a previous frame, and coding only those macroblocks where motion is detected; iii) replacing all coefficients of non-coded macroblocks with zero coefficients; iv) applying discrete cosine transformation (DCT) to coded macroblocks to produce DCT coefficients; v) reorganizing coefficients into a multi-resolution representation; vi) quantizing the coefficients with a uniform scalar quantizer to produce a significance map; and vii) adaptive arithmetic coding of said signal by a) encoding the motion information; b) encoding the significance map; c) encoding the signs of all significant coefficients; and d) encoding the magnitudes of significant coefficients, in bit-plane order starting with the most significant bit.

8. The computer program product of claim 7 wherein said previous frame is the previous original frame.

9. The computer program product of claim 8 wherein the motion detection and coding means are such that: i) if the motion detected does not exceed a threshold, then said macroblock is not coded; and iii) if the motion detected exceeds said threshold, then said macroblock is intracoded.

10. The computer program product of claim 7 wherein said computer usable medium further has computer readable code means embodied in same medium for reconstructing each frame from the motion information and significance map, and wherein said previous frame is the previous reconstructed frame.

11. The computer program product of claim 10 wherein the motion detection and coding means are such that: i) if the motion detected does not exceed a first threshold, then said macroblock is not coded; ii) if the motion detected exceeds said first threshold but does not exceed a second threshold, then the difference between said current frame and said previous frame is coded; and iii) if the motion detected exceeds both first and second thresholds, then said macroblock is intracoded.

12. The computer program product of claim 7 wherein said computer usable medium further has computer program code means for, regardless of whether or not motion is detected, periodically intracoding portions of each frame in a distributed manner.

* * * * *